United States Patent
Yamauchi et al.

(10) Patent No.: US 12,512,295 B2
(45) Date of Patent: Dec. 30, 2025

(54) LIGHT GUIDE, ELECTRON RAY DETECTOR, AND CHARGED PARTICLE DEVICE

(71) Applicant: HAMAMATSU PHOTONICS K.K., Hamamatsu (JP)

(72) Inventors: Kuniyoshi Yamauchi, Hamamatsu (JP); Minoru Kondo, Hamamatsu (JP); Takayuki Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 357 days.

(21) Appl. No.: 18/272,618

(22) PCT Filed: Nov. 25, 2021

(86) PCT No.: PCT/JP2021/043254
§ 371 (c)(1),
(2) Date: Jul. 17, 2023

(87) PCT Pub. No.: WO2022/190473
PCT Pub. Date: Sep. 15, 2022

(65) Prior Publication Data
US 2025/0079118 A1  Mar. 6, 2025

(30) Foreign Application Priority Data
Mar. 10, 2021 (JP) .................. 2021-038410

(51) Int. Cl.
*H01J 37/244* (2006.01)
*G02B 6/42* (2006.01)
(52) U.S. Cl.
CPC .......... *H01J 37/244* (2013.01); *G02B 6/4298* (2013.01)

(58) Field of Classification Search
CPC ............ H01J 37/244; H01J 2237/2443; G02B 6/4298; G02B 6/00; G02B 6/0003
(Continued)

(56) References Cited

U.S. PATENT DOCUMENTS 8,895,935 B2  11/2014  Wang et al.
9,355,815 B2  5/2016  Imamura et al.
(Continued)

FOREIGN PATENT DOCUMENTS

JP  2000-513487 A  10/2000
JP  2001-272471 A  10/2001
(Continued)

OTHER PUBLICATIONS

International Preliminary Report on Patentability mailed Sep. 21, 2023 for PCT/JP2021/043254.

*Primary Examiner* — Michael Maskell
(74) *Attorney, Agent, or Firm* — Faegre Drinker Biddle & Reath LLP

(57) ABSTRACT

There are provided a light guide, an electron ray detector, and a charged particle device that can improve light guiding efficiency of light generated in response to incidence of a detection ray. The electron ray detector includes: a light guide member extending in one direction; a first fluorescent substance layer provided on one end portion side of the light guide member and generating primary fluorescent light in response to incidence of a detection ray; a second fluorescent substance layer extending from one end to the other end of the light guide member and generating secondary fluorescent light in response to incidence of the primary fluorescent light; and a detection unit provided on the other end portion side of the light guide member and optically coupled to the light guide member.

12 Claims, 12 Drawing Sheets

(58) Field of Classification Search
USPC .................................. 250/306, 307, 310, 311
See application file for complete search history.

(56) References Cited

U.S. PATENT DOCUMENTS

2014/0374594 A1\* 12/2014 Kaneko ................. G01T 1/2008
250/311
2017/0271124 A1 9/2017 Sasaki et al.

FOREIGN PATENT DOCUMENTS

| | | |
|---|---|---|
| JP | 2009-187949 A | 8/2009 |
| JP | 2010-043971 A | 2/2010 |
| JP | 2011-249273 A | 12/2011 |
| JP | 2013-243055 A | 12/2013 |
| JP | 2015-005351 A | 1/2015 |
| JP | 2017-183126 A | 10/2017 |
| JP | 2020-129545 A | 8/2020 |
| TW | 201338003 A | 9/2013 |
| TW | 201901730 A | 1/2019 |
| WO | 98/000853 A1 | 1/1998 |

\* cited by examiner

Fig.8
(a)
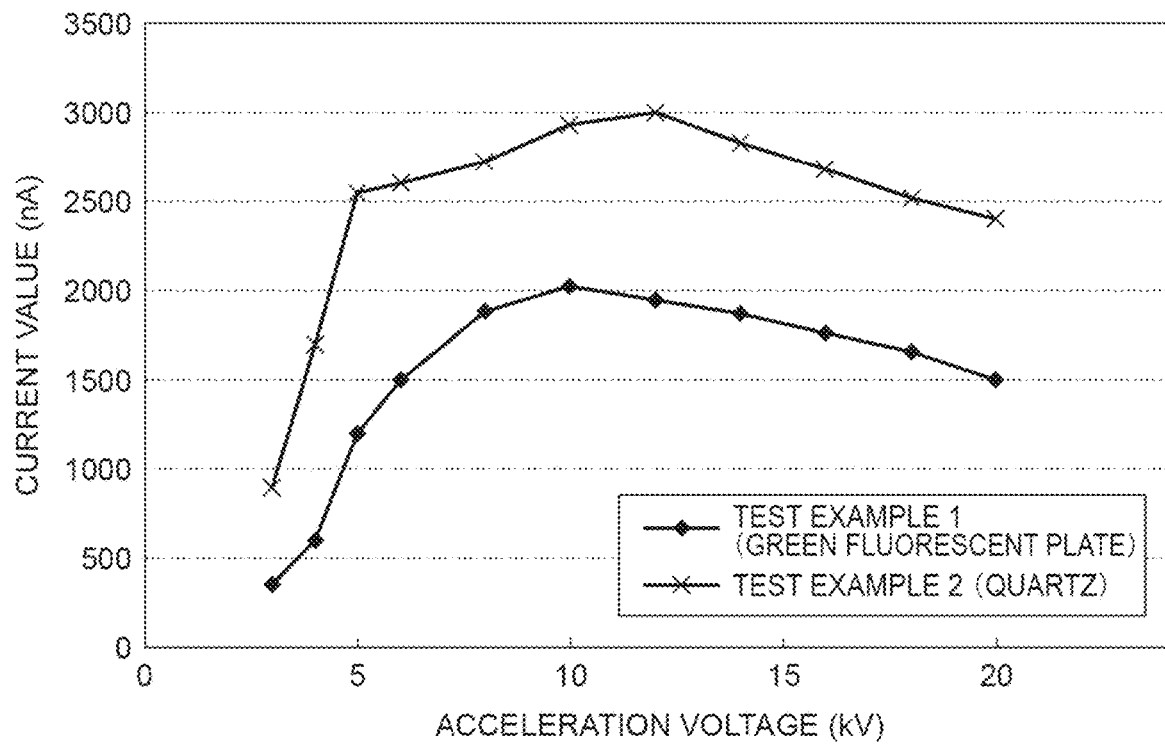
(b)
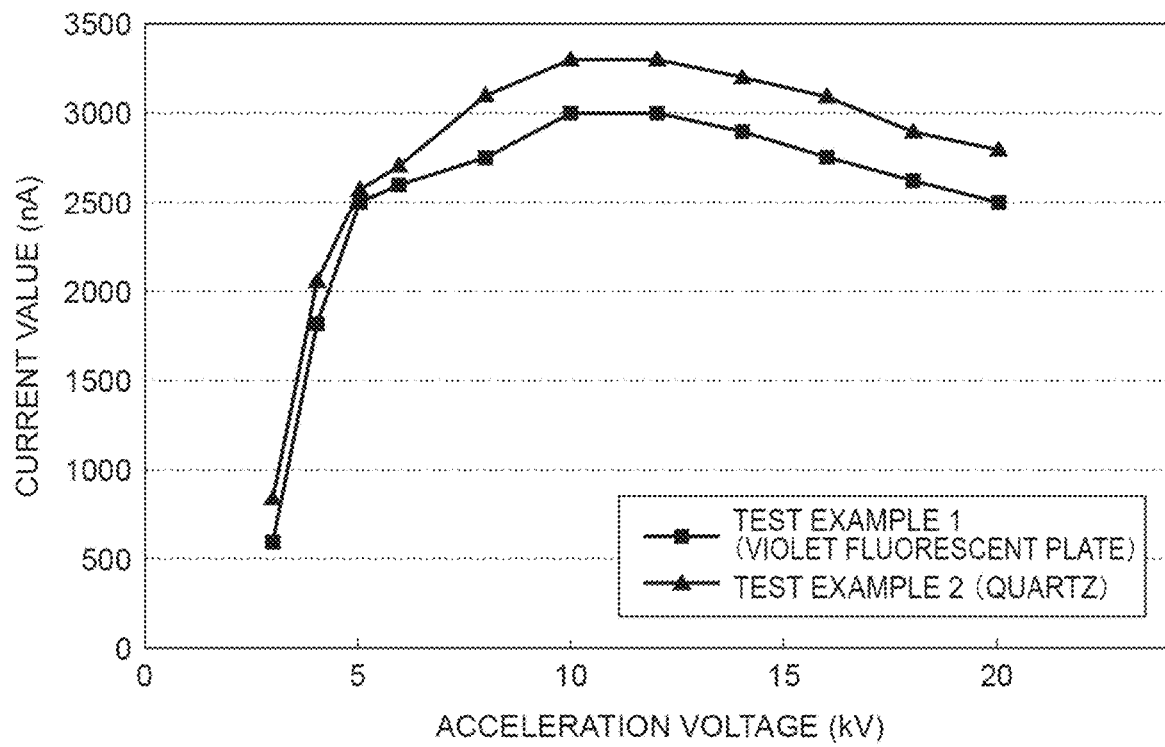

LIGHT GUIDE, ELECTRON RAY DETECTOR, AND CHARGED PARTICLE DEVICE

TECHNICAL FIELD

The present disclosure relates to a light guide, an electron ray detector, and a charged particle device.

BACKGROUND ART

In the related art, for example, detectors described in Patent Literatures 1 and 2 are known as electron ray detectors that are assembled into a scanning electron microscope. The detector described in Patent Literature 1 includes a scintillator-receiving part having a first surface facing a surface opposite to an incidence surface of a scintillator and a second surface facing a surface other than the surface opposite to the incidence surface of the scintillator in a light guide for guiding light generated in the scintillator to a light-receiving element. In the detector described in Patent Literature 1, a slope reflecting light incident from the second surface toward the inside of the light guide is provided.

CITATION LIST

Patent Literature

[Patent Literature 1] Japanese Unexamined Patent Publication No. 2017-183126
[Patent Literature 2] Japanese Unexamined Patent Publication No. 2013-243055

SUMMARY OF INVENTION

Technical Problem

In the aforementioned light guide or electron ray detector, there is demand for improvement in light guiding efficiency when light generated in response to incidence of a detection ray is guided to the detection unit in view of improvement in detection accuracy of a detection ray. In the detector described in Patent Literature 1, light emitted from two sides of a fluorescent substance is incident on the light guide due to formation of the slope, but an effect of improvement in light guiding efficiency is limited and the light guide is restricted in shape. In the detector described in Patent Literature 2, there is a problem in that it is difficult to secure the transparency of a ceramic fluorescent substance.

The present disclosure was invented in consideration of the aforementioned circumstances, and an objective thereof is to provide a light guide, an electron ray detector, and a charged particle device that can improve light guiding efficiency of light which is generated in response to incidence of a detection ray.

Solution to Problem

A light guide according to an aspect of the present disclosure includes: a light guide member extending in one direction; a first fluorescent substance layer provided on one end portion side of the light guide member and generating primary fluorescent light in response to incidence of a detection ray; and a second fluorescent substance layer extending from one end to the other end of the light guide member and generating secondary fluorescent light in response to incidence of the primary fluorescent light.

In this light guide, the second fluorescent substance layer generating secondary fluorescent light in response to incidence of the primary fluorescent light generated in the first fluorescent substance layer extends from one end to the other end of the light guide member. In the light guide, the primary fluorescent light generated in the first fluorescent substance layer is guided to the detection unit by the light guide member and the secondary fluorescent light generated in the second fluorescent substance layer in response to incidence of the primary fluorescent light is guided to the detection unit by the light guide member or the second fluorescent substance layer. Accordingly, it is possible to improve light guiding efficiency of light generated in response to incidence of a detection ray.

The second fluorescent substance layer may extend to be closer to the other end of the light guide member than the first fluorescent substance layer. In this case, it is possible to enhance incidence efficiency of the primary fluorescent light on the second fluorescent substance layer.

The second fluorescent substance layer may extend from the one end to the other end of the light guide member. In this case, it is possible to enhance incidence efficiency of the primary fluorescent light on the second fluorescent substance layer and to efficiently guide the secondary fluorescent light using the second fluorescent substance layer.

The light guide may further include a third fluorescent substance layer extending from one end to the other end of the light guide member and generating tertiary fluorescent light in response to incidence of the secondary fluorescent light. In this case, tertiary fluorescent light generated in the third fluorescent substance layer in response to incidence of the secondary fluorescent light is guided by the light guide member or the tertiary fluorescent substance layer. Accordingly, it is possible to further enhance light guiding efficiency of light generated in response to incidence of a detection ray.

The first fluorescent substance layer may be formed of one of gadolinium oxysulfide, yttrium silicate, YAG, YAP, a fluorescent substance with a quantum-well structure layer of InGaN/GaN, and ZnO. By employing such a first fluorescent substance layer, it is possible to realize fast response to a detection ray. It is also possible to prevent leakage of the primary fluorescent light generated in the first fluorescent substance layer to the outside.

The light guide member may be formed of transparent glass, a transparent resin, air, or vacuum. In this case, it is possible to secure light guiding efficiency of light using the light guide member with a simple configuration.

The light guide member may include a first surface and a second surface located opposite to the first surface, the first fluorescent substance layer may be provided on the first surface side, the second fluorescent substance layer may be provided on at least the second surface side, and the second surface may include a slope that is inclined to be closer to the first surface toward the one end on the one end portion side of the light guide member. By forming such a slope, it is possible to enhance incidence efficiency of the primary fluorescent light on the second fluorescent substance layer. It is also possible to achieve space saving when an electron ray detector including the light guide is assembled into a scanning electron microscope or the like.

The light guide may further include a reflecting film covering an edge of the second fluorescent substance layer on the one end portion side of the light guide member. Accordingly, it is possible to enhance incidence efficiency of the primary fluorescent light on the second fluorescent substance layer.

A through-hole penetrating the light guide member, the first fluorescent substance layer, and the second fluorescent substance layer may be provided on the one end portion side of the light guide member. The through-hole can be used as a hole through which an electron ray passes to a sample, for example, when an electron ray detector including the light guide is assembled into a scanning electron microscope.

The light guide may further include a metal film covering an inner wall of the through-hole. In this case, it is possible to stabilize a trajectory of an electron ray passing through the through-hole by applying a potential to the metal film.

An electron ray detector according to another aspect of the present disclosure includes: the light guide; and a detection unit provided on the other end portion side of the light guide member of the light guide and optically coupled to the light guide member.

In this electron ray detector, the second fluorescent substance layer generating secondary fluorescent light in response to incidence of the primary fluorescent light generated in the first fluorescent substance layer extends from one end to the other end of the light guide member. In the electron ray detector, the primary fluorescent light generated in the first fluorescent substance layer is guided by the light guide member and the secondary fluorescent light generated in the second fluorescent substance layer in response to incidence of the primary fluorescent light is guided by the light guide member or the second fluorescent substance layer. Accordingly, it is possible to improve light guiding efficiency of light generated in response to incidence of a detection ray.

A charged particle device according to another aspect of the present disclosure includes: an electron source emitting an electron ray to a sample; and a detector detecting charged particles which are generated from the sample in response to irradiation with the electron ray, and the detector is constituted by the electron ray detector.

In the electron ray detector applied to the charged particle device, the second fluorescent substance layer generating secondary fluorescent light in response to incidence of the primary fluorescent light generated in the first fluorescent substance layer extends from one end to the other end of the light guide member. In the electron ray detector, the primary fluorescent light generated in the first fluorescent substance layer is guided to the detection unit by the light guide member and the secondary fluorescent light generated in the second fluorescent substance layer in response to incidence of the primary fluorescent light is guided to the detection unit by the light guide member or the second fluorescent substance layer. Accordingly, it is possible to improve light guiding efficiency of light generated in response to incidence of a detection ray.

Advantageous Effects of Invention

According to the present disclosure, it is possible to enhance light guiding efficiency of light which is generated in a fluorescent substance.

BRIEF DESCRIPTION OF DRAWINGS

FIG. 1(a) is a plan view, FIG. 1(b) is a bottom view, and FIG. 1(c) is a sectional view.

FIGS. 8(a) and 8(b) are diagrams illustrating test results of the first effect confirmation test.

DESCRIPTION OF EMBODIMENTS

Hereinafter, a light guide, an electron ray detector, and a charged particle device according to exemplary embodiments of an aspect of the present disclosure will be described in detail with reference to the accompanying drawings.

First Embodiment

Figure 1:
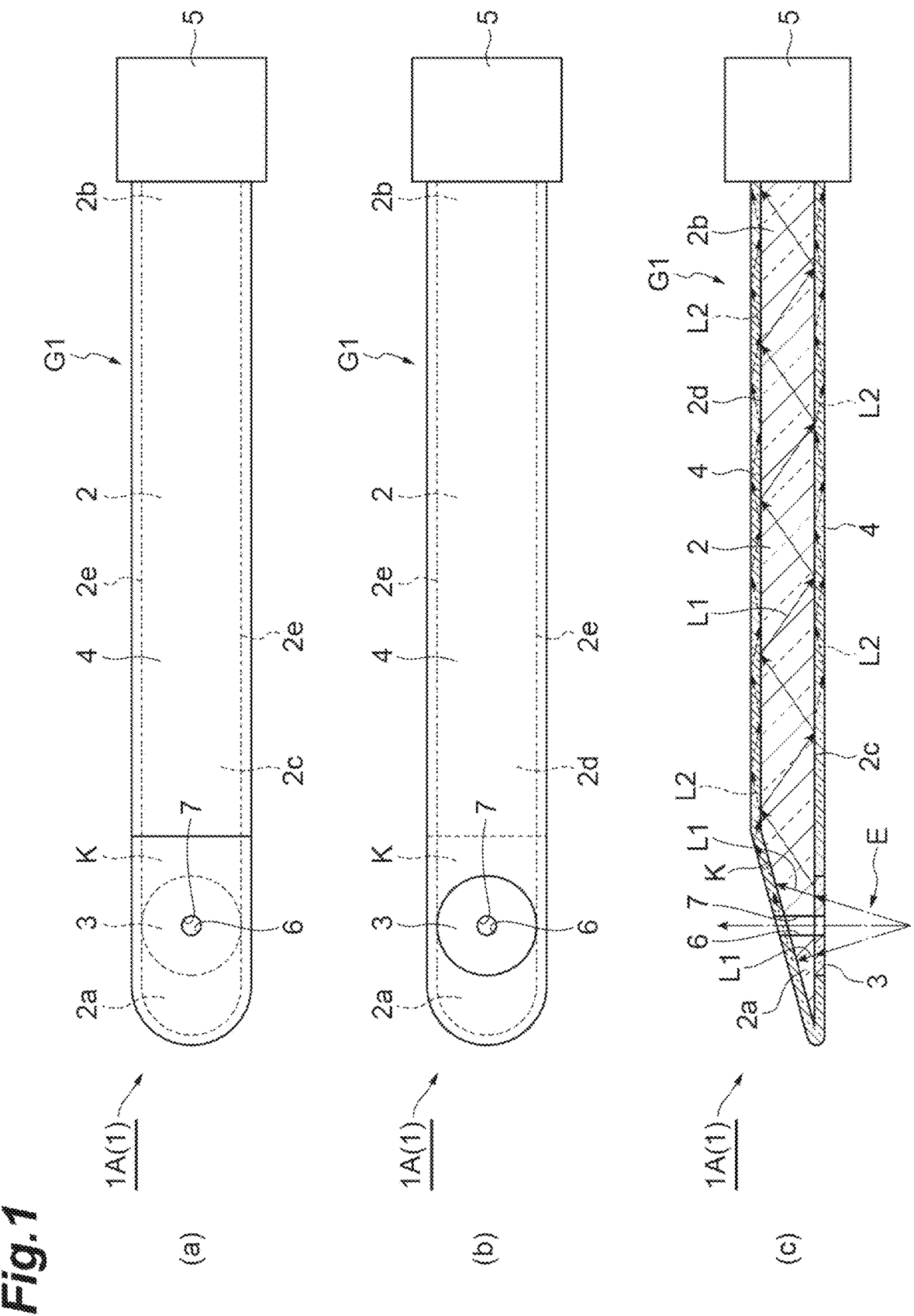
FIG. 1 is a diagram schematically illustrating a configuration of an electron ray detector according to a first embodiment, where

FIG. 1 is a diagram schematically illustrating a configuration of an electron ray detector according to a first embodiment, where FIG. 1(a) is a plan view, FIG. 1(b) is a bottom view, and FIG. 1(c) is a sectional view. An electron ray detector 1 is a device that detects a detection ray E such as an electron ray or an X-ray and includes a light guide G. The electron ray detector 1 is assembled into, for example, a charged particle device such as a general-purpose or semiconductor-inspection scanning electron microscope, a fluorescence microscope, an electron ray detector, or a radiation detector for use. The electron ray detector 1A according to the first embodiment includes a light guide G1 and a detection unit 5 as illustrated in FIGS. 1(a) to 1(c). The light guide G1 includes a light guide member 2, a first fluorescent substance layer 3, and a second fluorescent substance layer 4.

The light guide member 2 is a part for guiding fluorescent light generated in the first fluorescent substance layer 3 and the second fluorescent substance layer 4 in response to incidence of a detection ray E on the detection unit 5. The light guide member 2 is formed of, for example, a material having transparency to the fluorescent light generated in the first fluorescent substance layer 3 and the second fluorescent substance layer 4 such as transparent glass such as quartz glass or borosilicate glass or a transparent resin such as acryl. The light guide member 2 extends in one direction and includes one end portion 2a and another end portion 2b in the extending direction. In the example illustrated in FIG. 1, the light guide member 2 has a thin panel shape and includes a first surface 2c with the normal direction set to an axis perpendicular to the extending direction and a second surface 2d located opposite to the first surface 2c.

The first surface 2c is a flat surface from one end to the other end of the light guide member 2. The second surface 2d includes a slope K inclined to be closer to the first surface 2c toward the one end on the one end portion side of the light guide member 2. A slope angle of the slope K with respect to the first surface 2c ranges, for example, from 10° to 60°. A part of the second surface 2d on the other end portion side other than the slope K is a flat surface parallel to the first surface 2c. In the one end portion 2a of the light guide member 2, for example, a hole part with a circular section is provided such that the first surface 2c and the slope K of the second surface 2d are bound in the thickness direction of the light guide member 2.

The first fluorescent substance layer 3 is a layer that generates primary fluorescent light L1 in response to incidence of a detection ray. The first fluorescent substance layer 3 is formed of, for example, one of gadolinium oxysulfide, yttrium silicate, yttrium aluminum garnet (YAG), yttrium aluminum perovskite (YAP), a fluorescent substance with a quantum-well structure layer of InGaN/GaN, and ZnO. The first fluorescent substance layer 3 is provided in close contact with the first surface 2c side and extends in a predetermined range from one end to the other end of the light guide member 2. In the example illustrated in FIG. 1(b), the first fluorescent substance layer 3 has a circular shape in a plan view of the first surface 2c and is provided concentrically with the hole part of the light guide member 2. The diameter of the first fluorescent substance layer 3 is substantially the same as the width of the light guide member 2. A hole part with a circular section corresponding to the position of the hole part of the light guide member 2 and communicating with the hole part is provided at the center of the first fluorescent substance layer 3.

The second fluorescent substance layer 4 is a layer generating secondary fluorescent light L2 in response to incidence of the primary fluorescent light L1. The second fluorescent substance layer 4 is, for example, a violet fluorescent substance layer generating light in a violet wavelength band as secondary fluorescent light L2 and is formed of, for example, fluorescent acryl or fluorescent glass. The second fluorescent substance layer 4 is provided in close contact with, for example, at least the second surface 2d of the light guide member 2 and extends from one end to the other end of the light guide member 2. Here, the second fluorescent substance layer 4 extends to be closer to the other end of the light guide member 2 than the first fluorescent substance layer 3 and extends to an edge on the other end portion side of the light guide member 2. In the example illustrated in FIGS. 1(a) to 1(c), the second fluorescent substance layer 4 is provided to cover the whole light guide member 2. That is, the second fluorescent substance layer 4 is provided in the same thickness as the first fluorescent substance layer 3 on a part of the first surface 2c of the light guide member 2 other than the first fluorescent substance layer 3, the second surface 2d of the light guide member 2, and side surfaces 2e and 2e in the width direction of the light guide member 2.

On one end portion side of the light guide member 2, a hole part with a circular section corresponding to the position of the hole part of the light guide member 2 and communicating with the hole part is provided in the second fluorescent substance layer 4 covering the slope K. A through-hole 6 penetrating the light guide member 2, the first fluorescent substance layer 3, and the second fluorescent substance layer 4 in the thickness direction of the light guide member 2 is formed on the one end portion side of the light guide member 2 by the hole parts. A metal film 7 covering an inner wall of the through-hole 6 is provided to cover the inner wall. The metal film 7 is, for example, a film exhibiting a function of stabilizing a trajectory of an electron ray passing through the through-hole 6 by applying a potential thereto in applying the electron ray detector 1A to a scanning electron microscope. Examples of the material of the metal film 7 include aluminum and silver.

The detection unit 5 is a part detecting light generated in the first fluorescent substance layer 3 and the second fluorescent substance layer 4. The detection unit 5 is provided on the other end portion side of the light guide member 2 and is optically coupled to the light guide member 2. In the example illustrated in FIGS. 1(a) to 1(c), the detection unit 5 is constituted by, for example, a photomultiplier tube and optically coupled to both the light guide member 2 and the second fluorescent substance layer 4 on the other end portion side of the light guide member 2. The detection unit 5 outputs an output signal corresponding to an intensity of the detected light to an external device (not illustrated).

In the electron ray detector 1A having the aforementioned configuration, the light guide member 2 serves as a center light guide of fluorescent light generated in the first fluorescent substance layer 3 and the second fluorescent substance layer 4, and the second fluorescent substance layer 4 serves as a side light guide of fluorescent light generated in the first fluorescent substance layer 3 and the second fluorescent substance layer 4. Specifically, in the electron ray detector 1A, when a detection ray E is incident on the first fluorescent substance layer 3 as illustrated in FIG. 1(c), primary fluorescent light L1 based on an amount of detection ray E incident on the first fluorescent substance layer 3 is generated. Most of the primary fluorescent light L1 generated in the first fluorescent substance layer 3 is incident on the light guide member 2 and is incident on the detection unit 5 while repeating reflection in the light guide member 2.

A component leaking from the second surface 2d including the slope K to the outside of the light guide member 2 out of the primary fluorescent light L1 generated in the electron ray detector 1 is incident on the second fluorescent substance layer 4 located opposite to the first fluorescent substance layer 3 with the light guide member 2 interposed therebetween. When the primary fluorescent light L1 is incident on the second fluorescent substance layer 4, secondary fluorescent light L2 corresponding to an amount of primary fluorescent light L1 incident thereon is generated in the second fluorescent substance layer 4. Most of the secondary fluorescent light L2 generated in the second fluorescent substance layer 4 is incident on the detection unit 5 while repeating reflection in the second fluorescent substance layer 4. In this embodiment, a component leaking from the first surface 2c and the second surface 2d to the outside while reflection is being repeated in the light guide member 2 out of the primary fluorescent light L1 generated in the first fluorescent substance layer 3 is also incident on the second fluorescent substance layer 4. The secondary fluorescent light L2 generated in the second fluorescent substance layer 4 in response to the component is incident on the detection unit 5 while repeating reflection in the second fluorescent substance layer 4.

As described above, in the electron ray detector 1A, the second fluorescent substance layer 4 generating secondary fluorescent light L2 in response to incidence of the primary fluorescent light L1 generated in the first fluorescent substance layer 3 extends from one end to the other end of the light guide member 2. In the electron ray detector 1A, the primary fluorescent light L1 generated in the first fluorescent substance layer 3 is guided to the detection unit 5 by the light guide member 2 and the secondary fluorescent light L2 generated in the second fluorescent substance layer 4 in response to incidence of the primary fluorescent light L1 is also guided to the detection unit 5 by the light guide member 2 or the second fluorescent substance layer 4. Accordingly, it is possible to enhance light guiding efficiency of light generated in response to incidence of the detection ray E.

In this embodiment, the second fluorescent substance layer 4 extends to be closer to the other end of the light guide member 2 than the first fluorescent substance layer 3 and extends from one end to the other end of the light guide member 2. Accordingly, it is possible to enhance incidence efficiency of the primary fluorescent light L1 on the second fluorescent substance layer 4 and to efficiently guide the secondary fluorescent light L2 to the detection unit 5 via the second fluorescent substance layer 4.

In this embodiment, the first fluorescent substance layer 3 is formed of one of gadolinium oxysulfide, yttrium silicate, YAG, YAP, a fluorescent substance with a quantum-well structure layer of InGaN/GaN, and ZnO. Accordingly, it is possible to realize fast response to the detection ray E. It is possible to prevent the primary fluorescent light L1 generated in the first fluorescent substance layer 3 from leaking to the outside.

In this embodiment, the light guide member 2 is formed of transparent glass such as quartz glass or borosilicate glass or a transparent resin such acryl. Accordingly, it is possible to secure light guiding efficiency of light via the light guide member 2 with a simple configuration. When a configuration in which the second fluorescent substance layer 4 is provided to cover the light guide member 2 is employed as in this embodiment, the light guide member 2 may be formed of air or vacuum. In this case, since the electron ray detector 1A has a hollow structure including the first fluorescent substance layer 3 and the second fluorescent substance layer 4, it is possible to achieve further simplification and decrease in weight of the configuration.

In this embodiment, the first fluorescent substance layer 3 is provided on the first surface 2c side of the light guide member 2, and the second fluorescent substance layer 4 is provided on the second surface 2d side of the light guide member 2. On the second surface 2d, the slope K inclined to be closer to the first surface 2c toward one end is provided on the one end portion side of the light guide member 2. By forming the slope K, it is possible to enhance incidence efficiency of the primary fluorescent light L1 on the second fluorescent substance layer 4. It is possible to achieve space saving when the electron ray detector 1A is assembled into a scanning electron microscope.

In this embodiment, the through-hole 6 penetrating the light guide member 2, the first fluorescent substance layer 3, and the second fluorescent substance layer 4 is provided on the one end portion side of the light guide member 2. The through-hole 6 can be used as, for example, a hole through which an electron ray passes to a sample when the electron ray detector 1A is assembled into a scanning electron microscope. In this embodiment, the metal film 7 is provided to cover the inner wall of the through-hole 6. In this case, it is possible to stabilize a trajectory of an electron ray passing through the through-hole 6 by applying a potential to the metal film 7.

Second Embodiment

Figure 2:
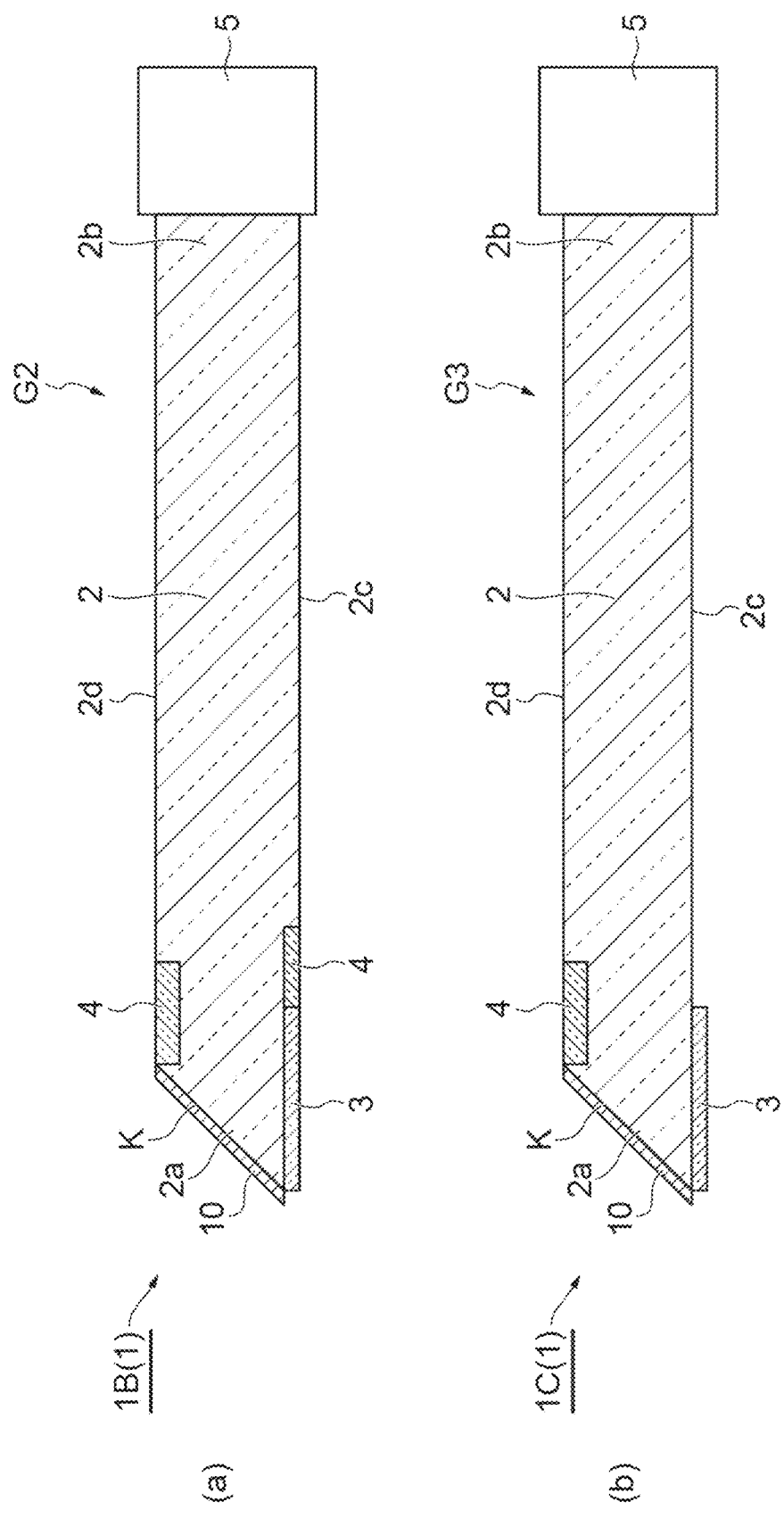
FIG. 2(a) is a sectional view schematically illustrating a configuration of an electron ray detector according to a second embodiment and FIG. 2(b) is a sectional view schematically illustrating a configuration of an electron ray detector according to a modified example thereof.

FIG. 2(a) is a sectional view schematically illustrating a configuration of an electron ray detector according to a second embodiment. FIG. 2(b) is a sectional view schematically illustrating a configuration of an electron ray detector according to a modified example thereof. The through-hole 6 is not illustrated for the purpose of simplification of description in the drawings, but the through-hole 6 is provided similarly to the first embodiment. On the other hand, the electron ray detectors 1B and 1C illustrated in the drawings are different from that of the first embodiment in that the second fluorescent substance layer 4 does not extend to an edge of the other end of the light guide member 2.

The electron ray detector 1B illustrated in FIG. 2(a) includes a light guide G2. In the light guide G2, both the extension lengths of the second fluorescent substance layer 4 on the first surface 2c side and the second surface 2d side of the light guide member 2 are equal to or less than half the extension length of the first fluorescent substance layer 3. In the example illustrated in FIG. 2(a), an edge on the other end portion 2b side of the second fluorescent substance layer 4 on the first surface 2c side is located closer to the other end portion 2b than the edge on the other end portion 2b side of the second fluorescent substance layer 4 on the second surface 2d side in the extending direction of the light guide member 2. The light guide member 2 is located between the second fluorescent substance layer 4 and the detection unit 5 on the first surface 2c side and between the second fluorescent substance layer 4 and the detection unit 5 on the second surface 2d side.

In the light guide G2, a reflecting film 10 is provided to cover an edge of the second fluorescent substance layer 4 on one end portion side of the light guide member 2. In the example illustrated in FIG. 2(a), the reflecting film 10 is provided to cover the slope K of the light guide member 2 (other than the through-hole 6). The reflecting film 10 is formed of, for example, a metal such as Al and reflects primary fluorescent light L1 and secondary fluorescent light L2 propagating to one end of the light guide member 2 to the other end.

The electron ray detector 1C illustrated in FIG. 2(b) is different from the electron ray detector 1B in that the second fluorescent substance layer 4 on the first surface 2c side of the light guide member 2 is omitted.

The electron ray detector 1C includes a light guide G3. In the light guide G3, the first fluorescent substance layer 3 on the first surface 2c side is provided on the first surface 2c, and the second fluorescent substance layer 4 on the second surface 2d side is provided to be flush with the second surface 2d.

In the electron ray detectors 1B and 1C, primary fluorescent light L1 generated in the first fluorescent substance layer 3 is guided to the detection unit 5 by the light guide member 2, and secondary fluorescent light L2 generated in the second fluorescent substance layer 4 in response to incidence of the primary fluorescent light L1 is guided to the detection unit 5 by the light guide member 2. Accordingly, it is possible to enhance light guiding efficiency of light generated in response to incidence of a detection ray E. In the electron ray detectors 1B and 1C, it is possible to enhance incidence efficiency of primary fluorescent light L1 on the second fluorescent substance layer 4 using the reflecting film 10 covering the edge of the second fluorescent substance layer 4 on the one end portion side of the light guide member 2. In this embodiment, since the reflecting film 10 covers the whole surface of the slope K of the light guide member 2, it is possible to enhance light guiding efficiency of secondary fluorescent light L2 generated in the second fluorescent substance layer 4. The reflecting film 10 may be applied to the light guide G1 according to the first embodiment.

Third Embodiment

Figure 3:
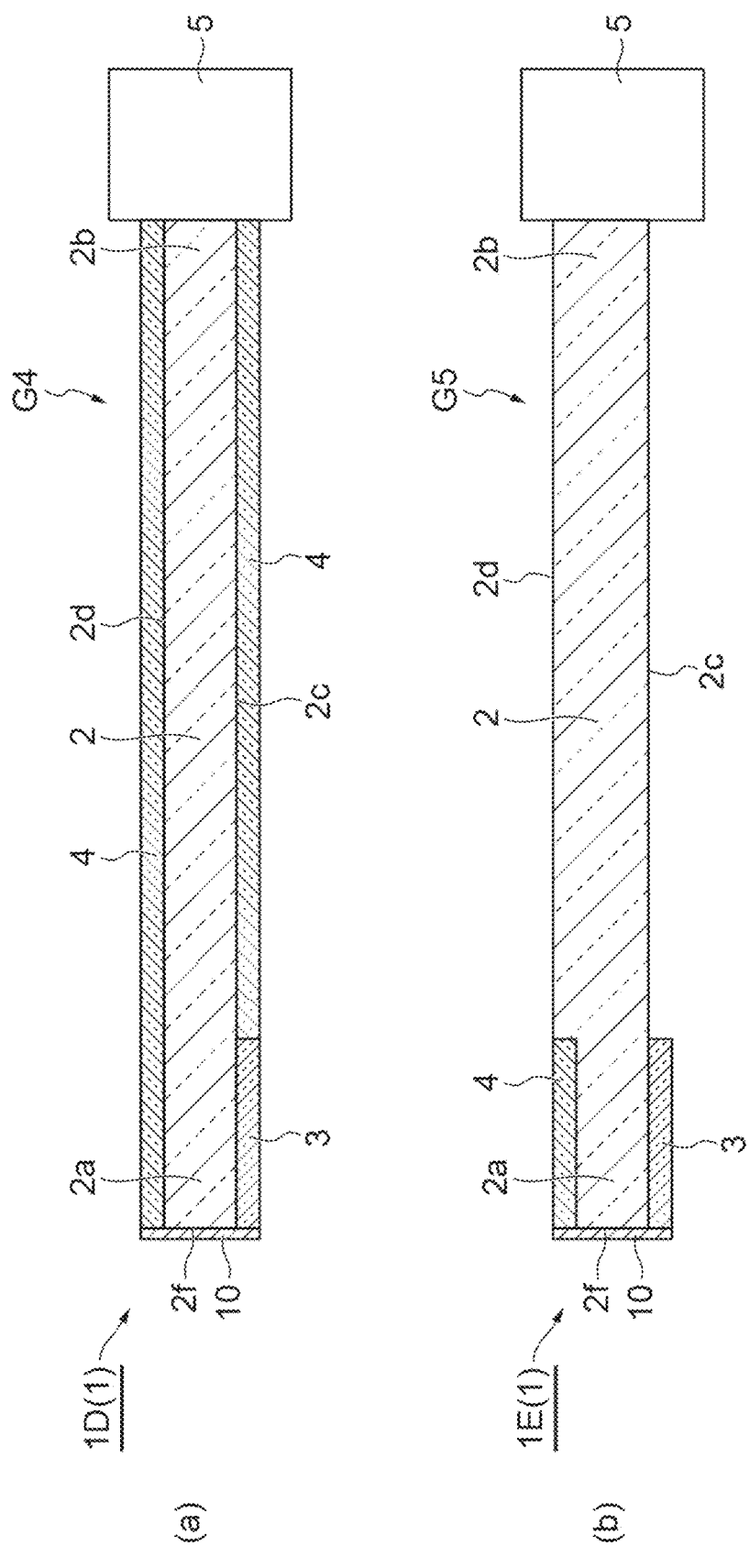
FIG. 3(a) is a sectional view schematically illustrating a configuration of an electron ray detector according to a third embodiment and FIG. 3(b) is a sectional view schematically illustrating a configuration of an electron ray detector according to a modified example thereof.

FIG. 3(a) is a sectional view schematically illustrating a configuration of an electron ray detector according to a third embodiment. FIG. 3(b) is a sectional view schematically illustrating a configuration of an electron ray detector according to a modified example thereof. As in FIG. 2, the through-hole 6 is not illustrated for the purpose of simplification of description in the drawings. Electron ray detectors 1D and 1E illustrated in the drawings are different from that of the first embodiment in that the slope K is not provided on the second surface 2d of the light guide member 2. That is, in the electron ray detectors 1D and 1E, the light guide member 2 has a rectangular parallelepiped shape extending in one direction.

The electron ray detector 1D illustrated in FIG. 3(a) includes a light guide G4. In the light guide G4, similarly to the first embodiment, the second fluorescent substance layer 4 is provided to cover the whole light guide member 2. That is, the second fluorescent substance layer 4 is formed in a part of the first surface 2c of the light guide member 2 other than the first fluorescent substance layer 3, the second surface 2d of the light guide member 2, and side surfaces (not illustrated) in the width direction of the light guide member 2. A reflecting film 10 is provided on an end face 2f on one end portion side of the light guide member 2. In the example illustrated in FIG. 3(a), the reflecting film 10 is provided to cover an end face 2f of the light guide member 2 on the one end portion side and to cover edges of the first fluorescent substance layer 3 and the second fluorescent substance layer 4 on the one end portion side of the light guide member 2.

The electron ray detector 1E illustrated in FIG. 3(b) is different from the electron ray detector 1D in the configuration of the second fluorescent substance layer 4. The electron ray detector 1E includes a light guide G5. In the light guide G5, the second fluorescent substance layer 4 is not provided on the first surface 2c side of the light guide member 2, and the extension length of the second fluorescent substance layer 4 on the second surface 2d side of the light guide member 2 is substantially the same as the extension length of the first fluorescent substance layer 3. In the extending direction of the light guide member 2, the edge on the other end portion 2b side of the second fluorescent substance layer 4 on the first surface 2c is located at the same position as the edge on the other end portion 2b side of the second fluorescent substance layer 4 on the second surface 2d. In the light guide G5, the first fluorescent substance layer 3 on the first surface 2c side is provided on the first surface 2c, and the second fluorescent substance layer 4 on the second surface 2d side is provided to be flush with the second surface 2d.

In the electron ray detectors 1D and 1E, primary fluorescent light L1 generated in the first fluorescent substance layer 3 is guided to the detection unit 5 by the light guide member 2, and secondary fluorescent light L2 generated in the second fluorescent substance layer 4 in response to incidence of the primary fluorescent light L1 is guided to the detection unit 5 by the light guide member 2 or the second fluorescent substance layer 4. Accordingly, it is possible to enhance light guiding efficiency of light generated in response to incidence of a detection ray E. In the electron ray detectors 1D and 1E, it is possible to enhance incidence efficiency of primary fluorescent light L1 on the second fluorescent substance layer 4 using the reflecting film 10 covering the edge of the second fluorescent substance layer 4 on the one end portion side of the light guide member 2. In this embodiment, since the reflecting film 10 covers an end face 1f on the one end portion side of the light guide member 2 and the edge of the first fluorescent substance layer 3 on one end portion side of the light guide member 2, it is possible to further enhance incidence efficiency of primary fluorescent light L1 on the second fluorescent substance layer 4 and to enhance light guiding efficiency of secondary fluorescent light L2 generated in the second fluorescent substance layer 4.

Fourth Embodiment

Figure 4:
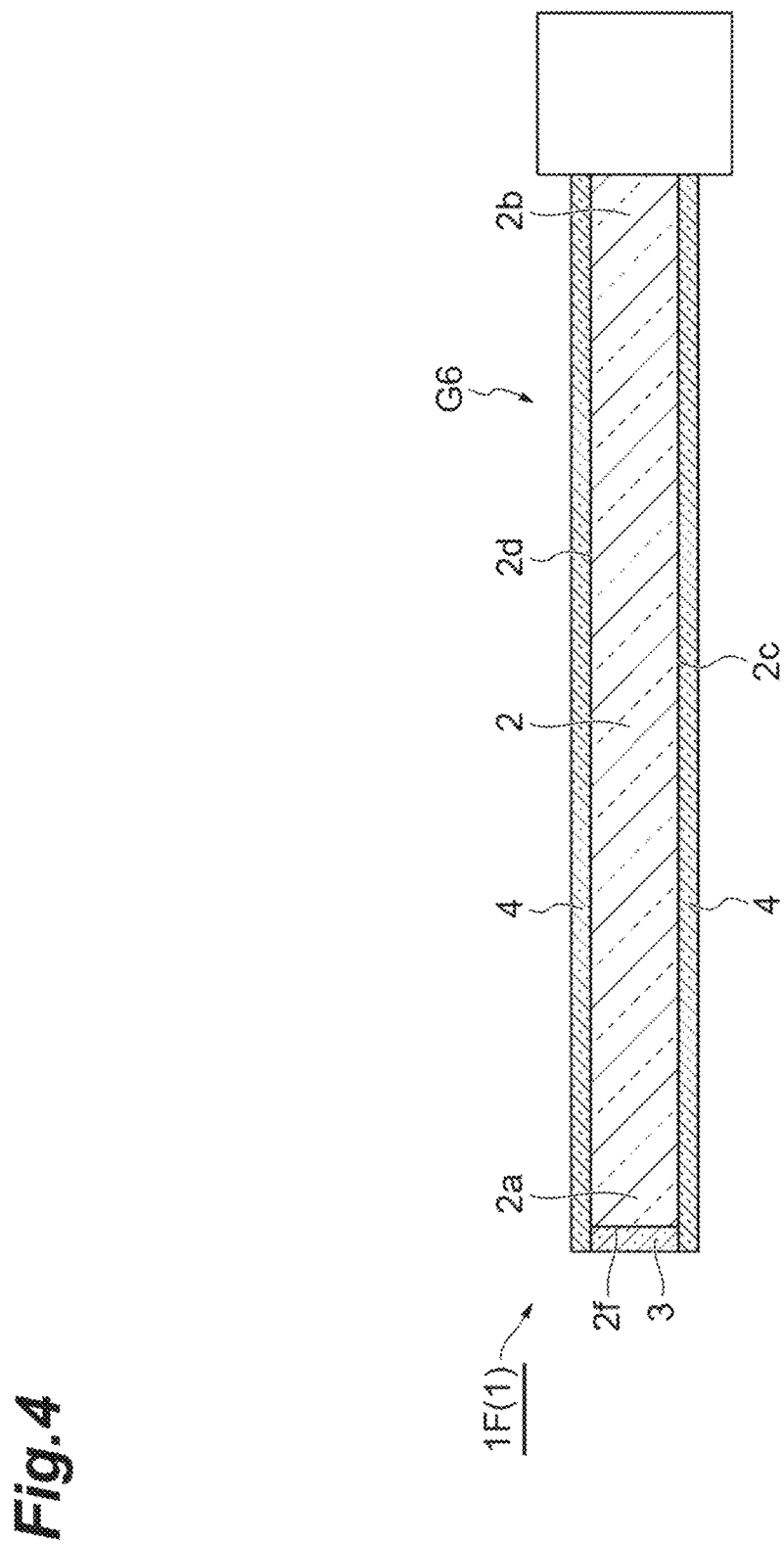
FIG. 4 is a sectional view schematically illustrating a configuration of an electron ray detector according to a fourth embodiment.
Figure 5:
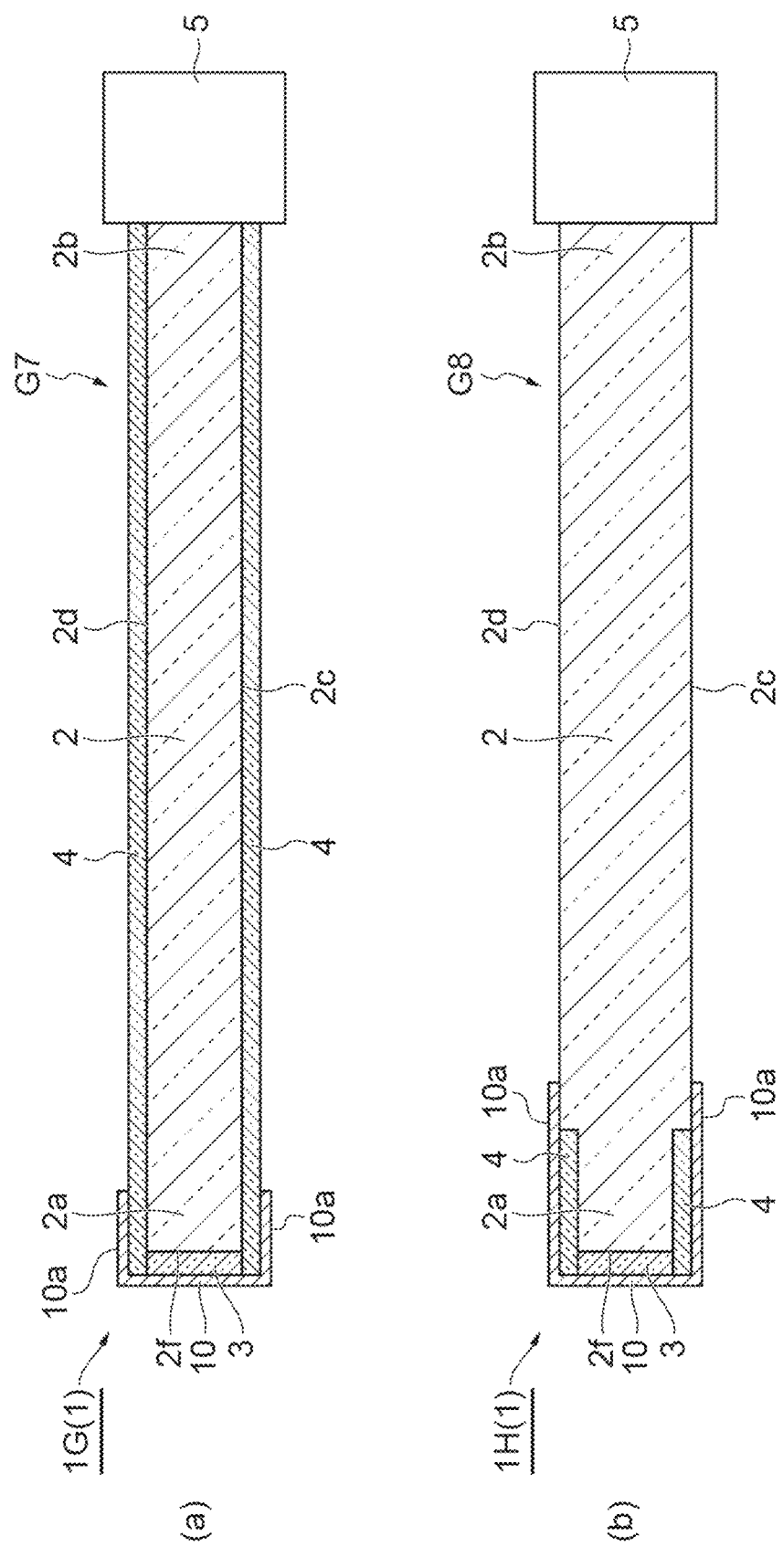
FIGS. 5(a) and 5(b) are sectional views schematically illustrating a configuration of an electron ray detector according to a modified example of the fourth embodiment.
Figure 6:
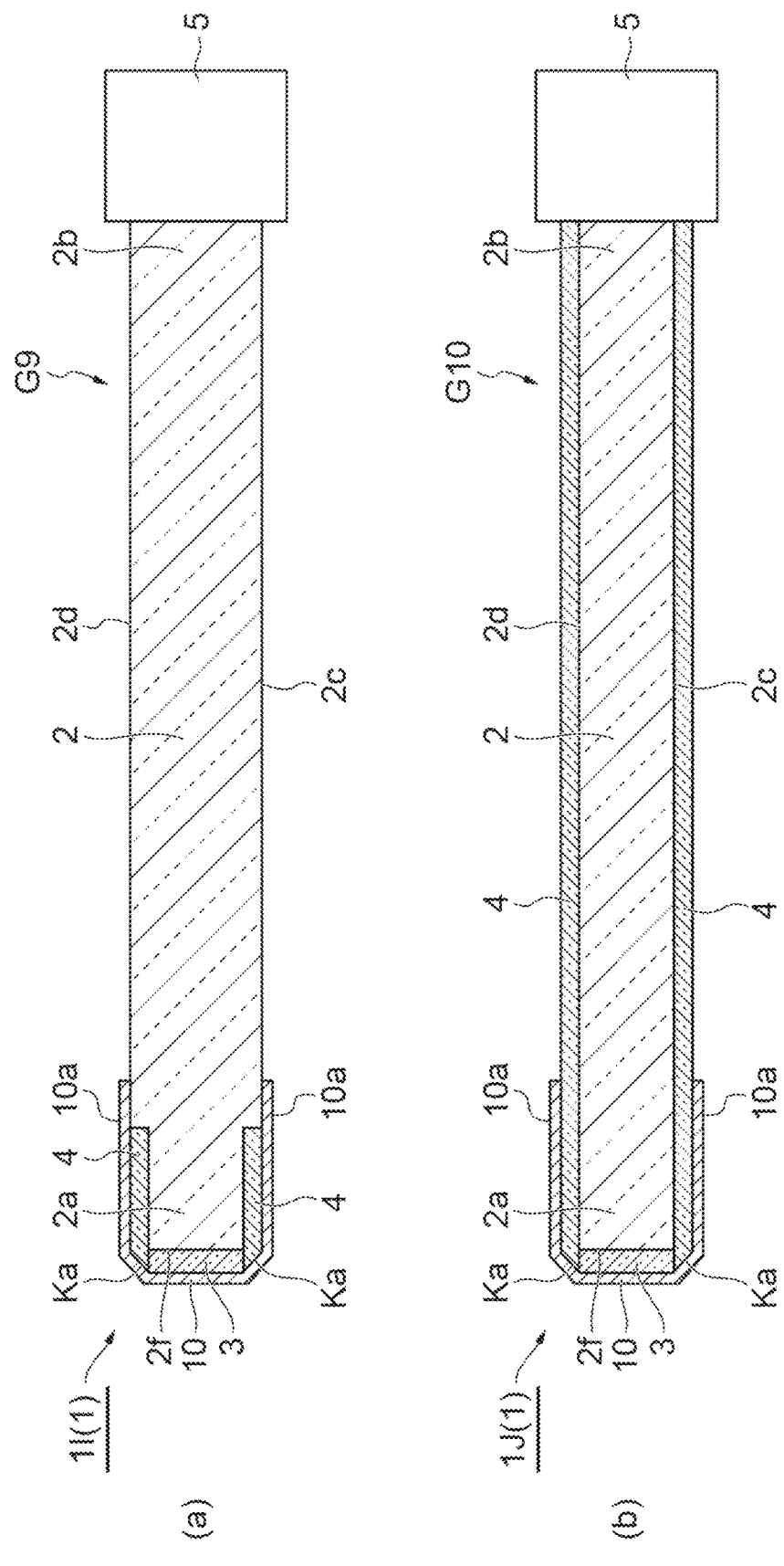
FIGS. 6(a) and 6(b) are sectional views schematically illustrating a configuration of an electron ray detector according to another modified example of the fourth embodiment.

FIG. 4 is a sectional view schematically illustrating a configuration of an electron ray detector according to a fourth embodiment. FIGS. 5 and 6 are sectional views schematically illustrating a configuration of an electron ray detector according to a modified example thereof. The electron ray detectors 1F to 1J illustrated in the drawings are different from that of the first embodiment in that the slope K is not provided on the second surface 2d of the light guide member 2. In the electron ray detectors 1F to 1J, the light guide member 2 has a cylindrical columnar shape extending in one direction.

As illustrated in FIG. 4, the electron ray detector 1F includes a light guide G6. In the light guide G6, the first fluorescent substance layer 3 is provided on the whole end face 2f on the one end portion side of the light guide member 2. The second fluorescent substance layer 4 is provided to cover the whole peripheral surface of the light guide member 2 and the whole peripheral surface of the first fluorescent substance layer 3.

The electron ray detector 1G illustrated in FIG. 5(a) is different from the electron ray detector 1F in that the reflecting film 10 is added to the configuration of the electron ray detector 1F. The electron ray detector 1G includes a light guide G7. In the light guide G7, the reflecting film 10 is provided on one end portion side of the light guide member 2 to cover the edges of the first fluorescent substance layer 3 and the second fluorescent substance layer 4 on the one end portion side of the light guide member 2. Apart of the reflecting film 10 extends over the peripheral surface of the second fluorescent substance layer 4. An edge of the extension part 10a of the reflecting film 10 on the other end portion 2b side is located closer to the other end portion 2b than the edge of the first fluorescent substance layer 3 on the other end portion 2b side.

The electron ray detector 1H illustrated in FIG. 5(b) is different from the electron ray detector 1F in that the second fluorescent substance layer 4 does not extend to an edge of the other end portion side of the light guide member 2. The electron ray detector 1H includes a light guide G8. In the light guide G8, an edge of the second fluorescent substance layer 4 on the other end portion 2b side is located closer to the other end portion 2b than an edge of the first fluorescent substance layer 3 on the other end portion 2b side. An edge of the extension part 10a of the reflecting film 10 on the other end portion 2b side is located closer to the other end portion 2b than an edge of the first fluorescent substance layer 3 on the other end portion 2b side. An edge of the extension part 10a of the reflecting film 10 on the other end portion 2b side is located closer to the other end portion 2b than an edge of the second fluorescent substance layer 4 on the other end portion 2b side. That is, the extension part 10a of the reflecting film 10 covers the whole peripheral surface of the second fluorescent substance layer 4.

The electron ray detector 1I illustrated in FIG. 6(a) is different from the electron ray detector 1F in that an edge of the second fluorescent substance layer 4 on the one end portion 2a side has a slope Ka. The electron ray detector 1I includes alight guide G9. In the light guide G9, the thickness of the second fluorescent substance layer 4 in a part in which the slope Ka is formed decreases gradually toward one end of the light guide member 2. The reflecting film 10 is provided to cover the first fluorescent substance layer 3 and the second fluorescent substance layer 4 in addition to the slope Ka. As in the light guide G8, the extension part 10a of the reflecting film 10 covers the whole peripheral surface of the second fluorescent substance layer 4.

Similarly to the electron ray detector 1I, the electron ray detector 1J illustrated in FIG. 6(a) is different from the electron ray detector 1F in that an edge of the second fluorescent substance layer 4 on the one end portion 2a side has a slope Ka. The electron ray detector 1J includes a light guide G10. In the electron ray detector 1J, the thickness of the second fluorescent substance layer 4 in a part in which the slope Ka is formed decreases gradually toward one end of the light guide member 2. On the other hand, the second fluorescent substance layer 4 is provided to cover the whole peripheral surface of the light guide member 2 and the whole peripheral surface of the first fluorescent substance layer 3. The reflecting film 10 is provided to cover the whole first fluorescent substance layer 3 and a part (a part on the first fluorescent substance layer 3 side) of the second fluorescent substance layer 4 including the slope Ka.

In the electron ray detectors 1F to 1J, primary fluorescent light L1 generated in the first fluorescent substance layer 3 is guided to the detection unit 5 by the light guide member 2, and secondary fluorescent light L2 generated in the second fluorescent substance layer 4 in response to incidence of the primary fluorescent light L1 is guided to the detection unit 5 by the light guide member 2 or the second fluorescent substance layer 4. Accordingly, it is possible to enhance light guiding efficiency of light generated in response to incidence of a detection ray E. In the electron ray detectors 1G to 1J, it is possible to enhance incidence efficiency of primary fluorescent light L1 on the second fluorescent substance layer 4 using the reflecting film 10 covering the edge of the second fluorescent substance layer 4 on the one end portion side of the light guide member 2. In this embodiment, the reflecting film 10 covers the first fluorescent substance layer 3 and the extension part 10a of the reflecting film 10 covers the whole peripheral surface of the second fluorescent substance layer 4. Accordingly, it is possible to further enhance incidence efficiency of primary fluorescent light L1 on the second fluorescent substance layer 4 and to enhance light guiding efficiency of secondary fluorescent light L2 generated in the second fluorescent substance layer 4.

[Effect Confirmation Test]

An effect confirmation test of the light guide and the electron ray detector according to the present disclosure will be described below.

Figure 7:
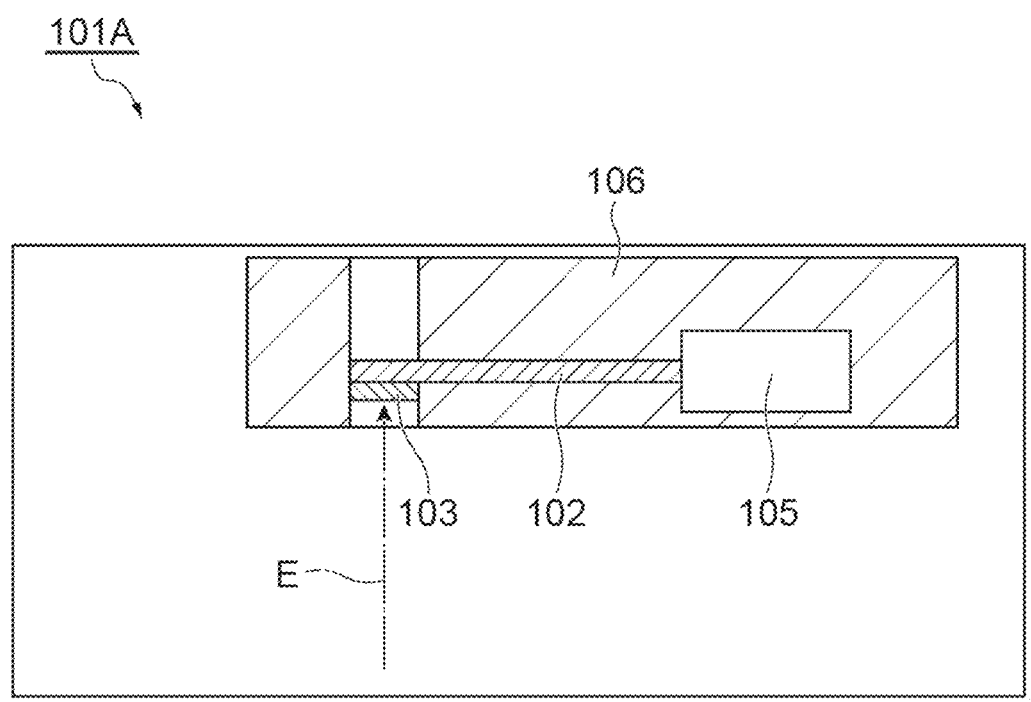
FIG. 7 is a diagram schematically illustrating a measurement system of a first effect confirmation test.

FIG. 7 is a diagram schematically illustrating a measurement system for a first effect confirmation test. The first effect confirmation test is a test for ascertaining a relationship between a material of a light guide member and light guiding efficiency of light when knowledge associated with the light guide and the electron ray detector according to the present disclosure is obtained. As illustrated in FIG. 7, a measurement system 101A for the first effect confirmation test includes a light guide member 102 extending in one direction, a fluorescent substance layer 103 provided in close contact with a first surface of the light guide member 102 on one end portion side of the light guide member 102, and a detection unit 105 provided on the other end portion side of the light guide member 102.

In test example 1, the light guide member 102 was formed of an acrylic fluorescent plate. In test example 2, the light guide member 102 was formed of quartz. As the acrylic fluorescent plate, two types including a green fluorescent plate generating light in a green wavelength band as secondary fluorescent light and a violet fluorescent plate generating light in a violet wavelength band as secondary fluorescent light were used. The fluorescent substance layer 103 was formed of a fast fluorescent substance including GaN, and the detection unit 105 was configured by a photomultiplier tube. The light guide member 102, the fluorescent substance layer 103, and the detection unit 105 were covered with a shading jig 106 except for an incidence position of a detection ray E, and a current value of a signal output from the detection unit 105 in response to incidence of the detection ray E was measured for each of test examples 1 and 2.

FIGS. 8(a) and 8(b) are diagrams illustrating measurement results in the first effect confirmation test. In the drawings, the horizontal axis represents an acceleration voltage of a detection ray, and the vertical axis presents a current value of the detection unit. From the results illustrated in the drawings, it can be seen that the current value of the detection unit 105 in response to the detection ray E is higher at the same intensity in test example 2 than in test example 1 when the light guide member 102 was formed of a green fluorescent plate and when the light guide member 102 was formed of a violet fluorescent plate. As a result, knowledge that light guiding efficiency of light could not be increased even if primary fluorescent light generated in the fluorescent substance layer was incident on the fluorescent substance layer directly (without passing through a light guide member formed of quartz or the like) was obtained.

In the first effect confirmation test, a reason why there is a difference between the detection results when the light guide member 102 was formed of quartz and when the light guide member 102 was formed of an acrylic fluorescent plate is considered to be diffusion of the detection ray E incident on the light guide member 102. Specifically, in the measurement system 101A, primary fluorescent light generated in the fluorescent substance layer 103 in response to incidence of a detection ray E is diffused light and is incident on the light guide member 102 with diffusion close to 180° from the generation position. When the light guide member 102 was formed of an acrylic fluorescent plate, the primary fluorescent light incident from the fluorescent substance layer 103 re-emits fluorescent light as secondary fluorescent light in the acrylic fluorescent plate. However, diffusion of light based on secondary fluorescent light is substantially the same as diffusion of primary fluorescent light incident on the light guide member 102 from the fluorescent substance layer 103 when the light guide member 102 was formed of quartz. Accordingly, it is thought that a total amount of light guided to the detection unit 105 decreases because a transmission coefficient of the acrylic fluorescent plate is lower than the transmission coefficient of quartz.

Figure 9:
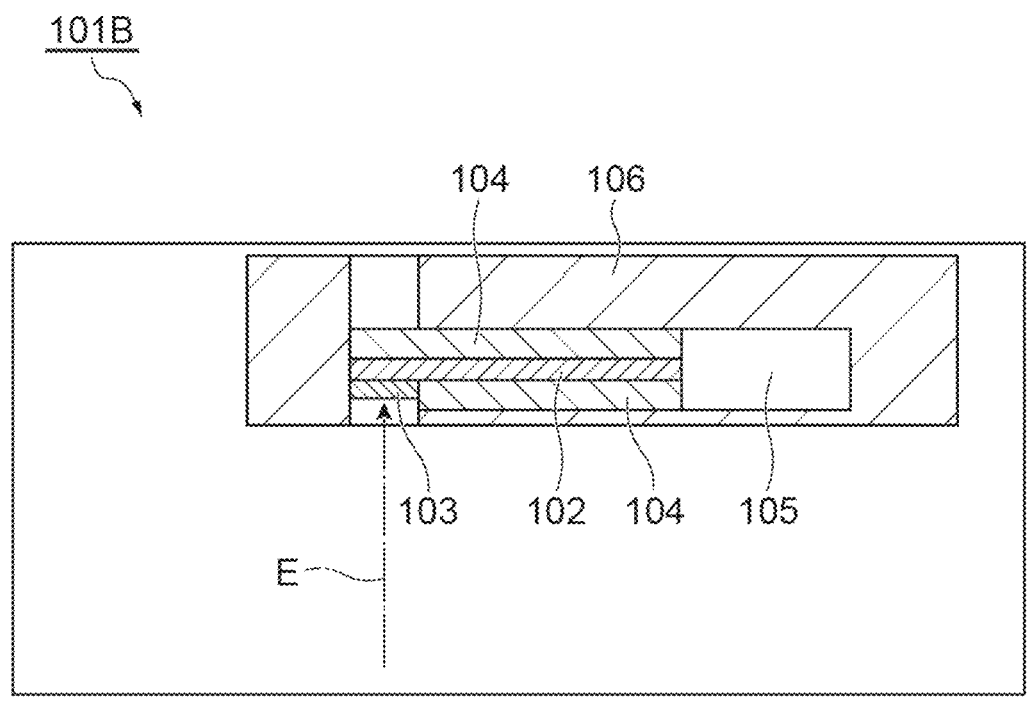
FIG. 9 is a diagram schematically illustrating a measurement system of a second effect confirmation test.

FIG. 9 is a diagram schematically illustrating a measurement system for a second effect confirmation test. As illustrated in the drawing, the measurement system 101B for the second effect confirmation test is different from the measurement system 101A for the first effect confirmation test in that a side light guide member 104 is provided on each of the first surface side and the second surface side of the light guide member 102. The side light guide member 104 on the first surface side is adjacent to the fluorescent substance layer 103 and extends to an edge on the other end portion side of the light guide member 102, and the side light guide member 104 on the second surface side extends from an edge on one end portion side of the light guide member 102 to an edge on the other end portion side. In any of an example and a comparative example, the light guide member 102 was formed of quartz. On the other hand, the side light guide members 104 were formed of a fluorescent acrylic plate in the example, and the side light guide members 104 were formed of quartz in the comparative example.

Figure 10:
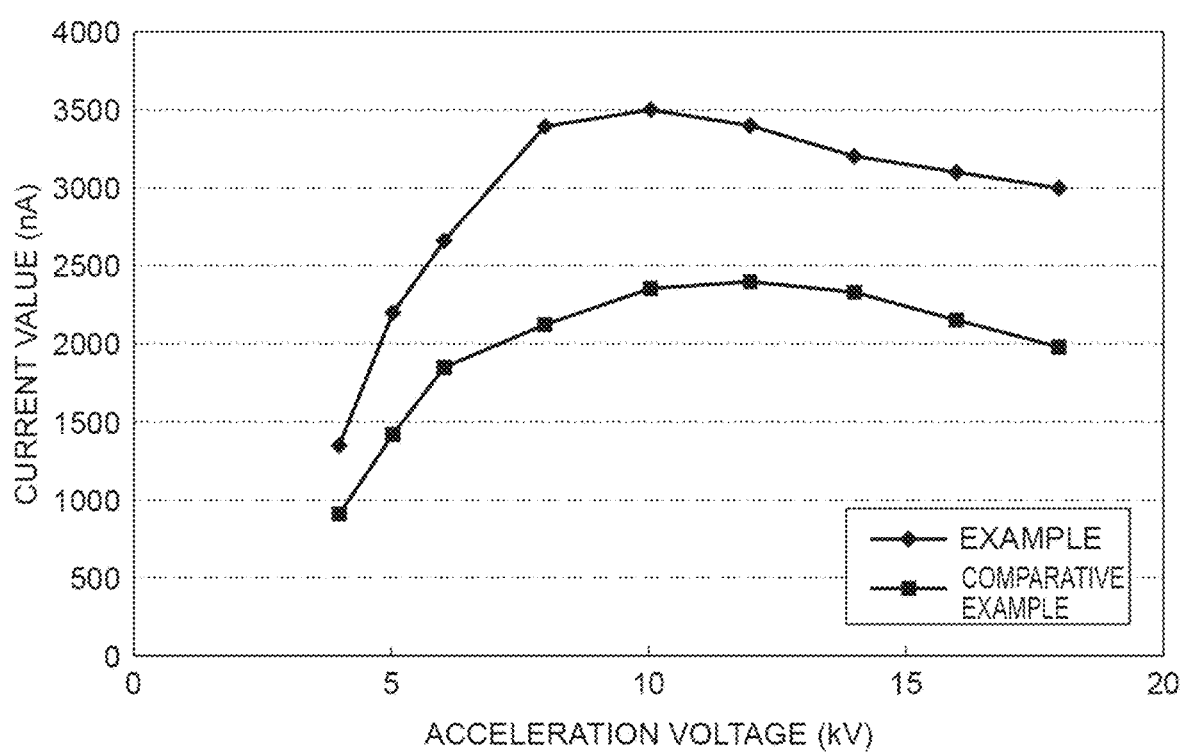
FIG. 10 is a diagram illustrating test results of the second effect confirmation test.

FIG. 10 is a diagram illustrating test results in the second effect confirmation test. In the drawings, similarly to FIGS. 8(*a*) and 8(*b*), the horizontal axis represents an acceleration voltage of a detection ray, and the vertical axis represents a current value of the detection unit. From the results illustrated in FIG. 10, it can be seen that the current value of the detection unit 105 in response to a detection ray E is 40% higher in average at the same intensity in the example than in the comparative example. As a result, knowledge that light guiding efficiency of light could be increased by guiding primary fluorescent light generated in the fluorescent substance layer 103 using the light guide member 102 formed of quartz or the like and guiding secondary fluorescent light generated in response to the primary fluorescent light using the side light guide members 104 different from the light guide member 102 was obtained.

In the measurement system 101B, primary fluorescent light generated in the fluorescent substance layer 103 in response to incidence of a detection ray E is diffused light and is incident on the light guide member 102 with diffusion close to 180° from the generation position.

In the comparative example, both the light guide member 102 and the side light guide member 104 are formed of quartz. Accordingly, it is thought that a component with an angle equal to or less than a predetermined angle (a threshold angle) of the primary fluorescent light generated in the fluorescent substance layer 103 passes through the light guide member 102 and the side light guide member 104 opposite to the fluorescent substance layer 103 and exits to the outside and a total amount of light guided to the detection unit 105 is merely a part of the primary fluorescent light.

On the other hand, in the example, a component with an angle equal to or less than a predetermined angle (a threshold angle) of the primary fluorescent light generated in the fluorescent substance layer 103 is incident on the side light guide member 104 opposite to the fluorescent substance layer 103, and thus secondary fluorescent light is generated. It is though that the secondary fluorescent light is guided by the side light guide member 104 and thus a total amount of light guided to the detection unit 105 is increased. In the example, apart of the secondary fluorescent light can be guided by the light guide member 102 and a part of the primary fluorescent light guided by the light guide member 102 can be incident on the side light guide member 104 on the fluorescent substance layer 103 side to generate secondary fluorescent light. Accordingly, it is though that the total amount of light guided to the detection unit 105 is further increased.

Modified Example

Figure 11:
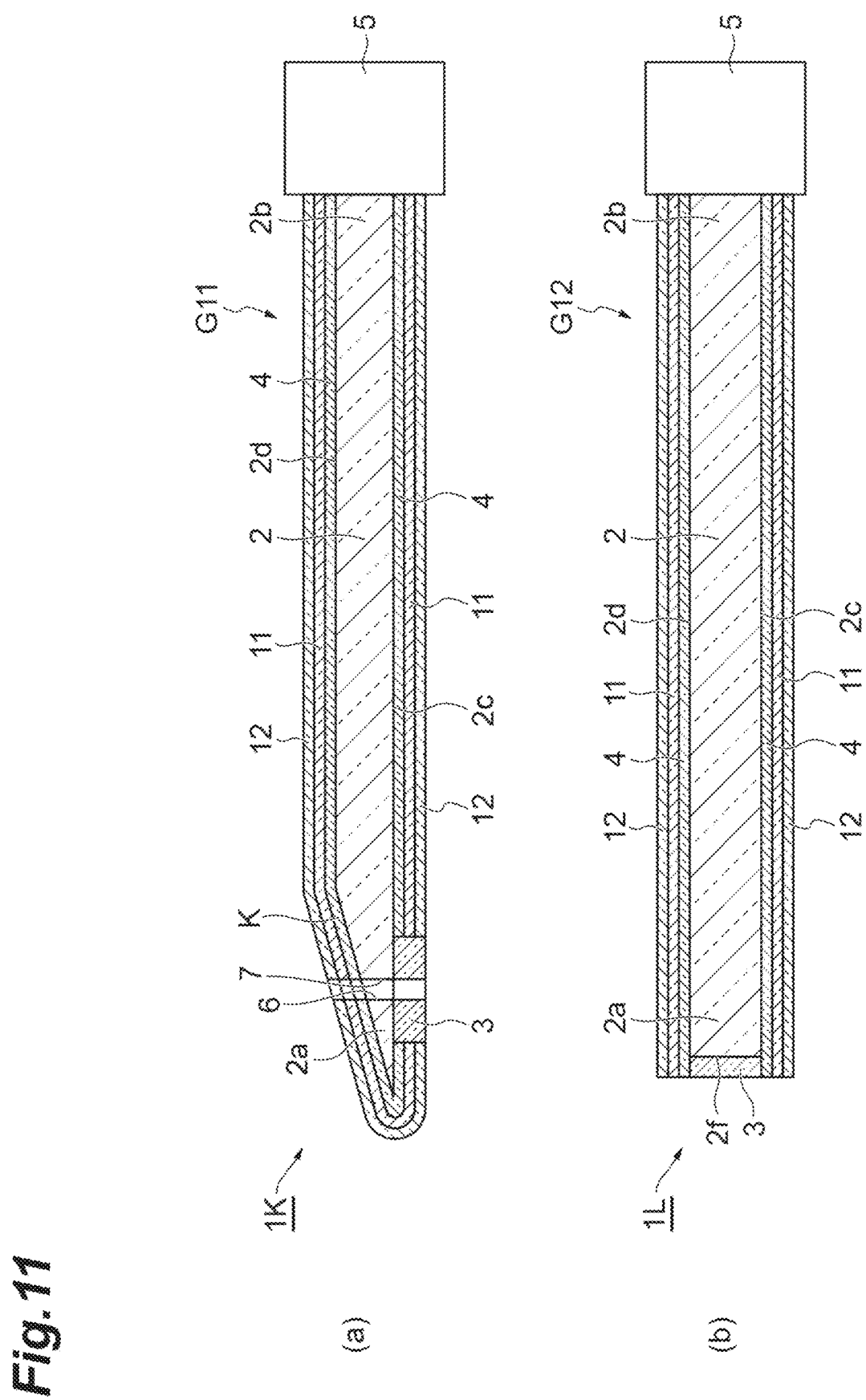
FIGS. 11(a) and 11(b) are sectional views schematically illustrating a configuration of an electron ray detector according to another modified example.

The present disclosure is not limited to the aforementioned embodiments. For example, the light guide G in the embodiments includes the first fluorescent substance layer 3 and the second fluorescent substance layer 4, but the light guide G may further include a third fluorescent substance layer 11 generating tertiary fluorescent light in response to incidence of secondary fluorescent light in addition to the fluorescent substance layers as illustrated in FIGS. 11(*a*) and 11(*b*). In this case, by causing the third fluorescent substance layer 11 to extend from one end to the other end of the light guide member 2, tertiary fluorescent light generated in the third fluorescent substance layer 11 is guided to the detection unit 5 by the light guide member 2 or the third fluorescent substance layer 11. Accordingly, it is possible to further enhance light guiding efficiency of light generated in response to incidence of a detection ray E.

The light guide G may further include a fourth fluorescent substance layer 12 generating quartic fluorescent light in response to incidence of the tertiary fluorescent light in addition to the third fluorescent substance layer 11. As illustrated in FIG. 11(*a*), in a light guide G11 constituting an electron ray detector 1K, the third fluorescent substance layer 11 is provided to cover the outer surface side of the second fluorescent substance layer 4 and the fourth fluorescent substance layer 12 is provided to cover the outer surface side of the third fluorescent substance layer 11 in addition to the configuration of the light guide G1 according to the first embodiment. As illustrated in FIG. 11(*b*), in a light guide G12 constituting an electron ray detector 1L, the third fluorescent substance layer 11 is provided to cover the outer surface side of the second fluorescent substance layer 4 and the fourth fluorescent substance layer 12 is provided to cover the outer surface side of the third fluorescent substance layer 11 in addition to the configuration of the light guide G6 according to the fourth embodiment.

When higher-order fluorescent substance layers are provided, it is preferable that a wavelength of n-th fluorescent light generated in an n-th fluorescent substance layer (where n is an integer) be as close to as an excitation center wavelength of an (n+1)-th fluorescent substance layer. When the second fluorescent substance layer 4 is, for example, a violet fluorescent substance layer generating light in a violet wavelength band as secondary fluorescent light, for example, it is preferable that the third fluorescent substance layer 11 be a green fluorescent substance layer generating light in a green wavelength band as tertiary fluorescent light and the fourth fluorescent substance layer 12 be a red fluorescent substance layer generating light in a red wavelength band as quartic fluorescent light.

Figure 12:
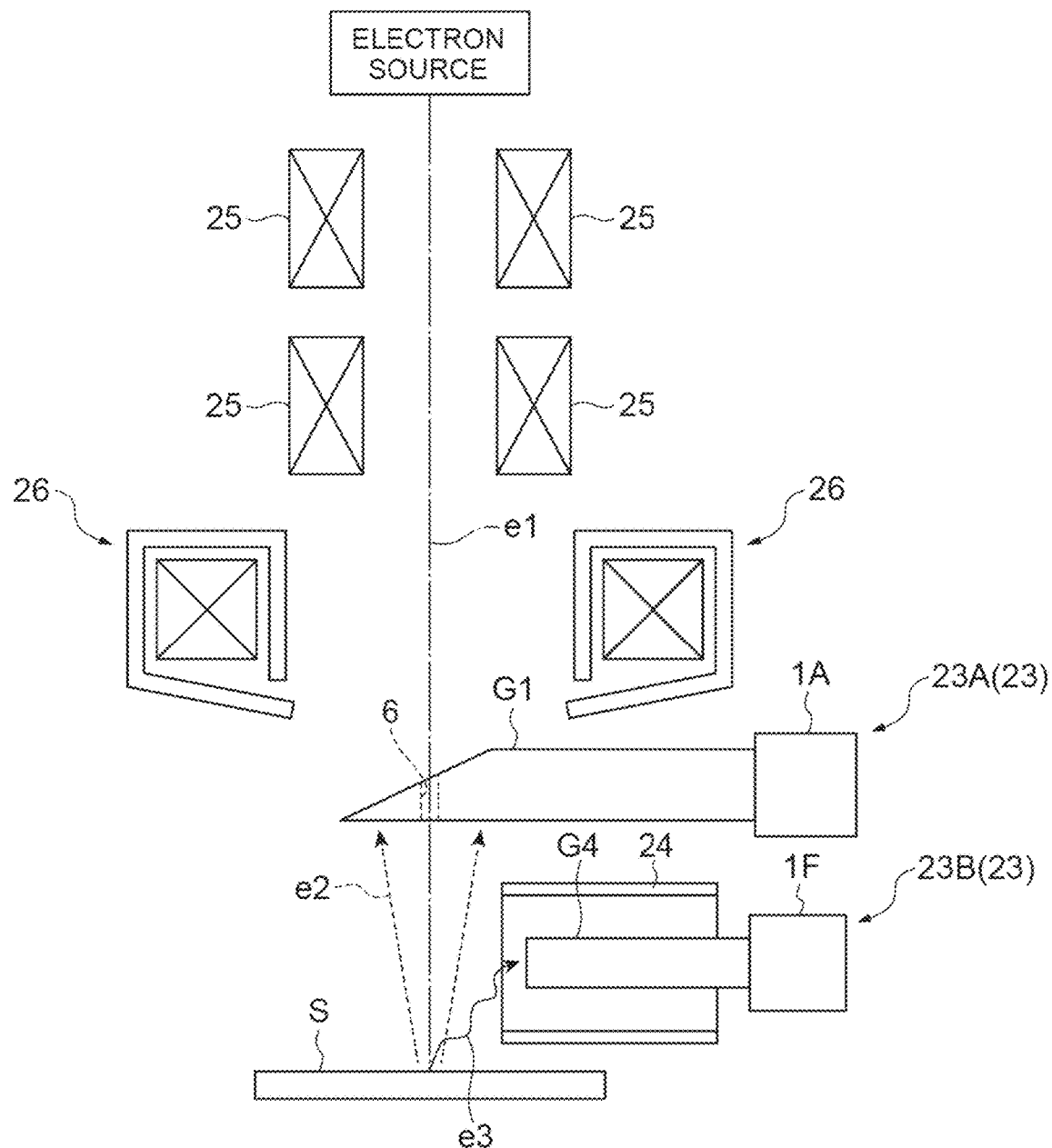
FIG. 12 is a diagram schematically illustrating a configuration of a charged particle device to which the electron ray detector according to the present disclosure is applied.

FIG. 12 is a diagram schematically illustrating a configuration of a charge particle device employing the electron ray detector according to the present disclosure. The charged particle device 21 illustrated in the drawing is configured as a scanning electron microscope. The charged particle device 21 includes an electron source 22 emitting an electron ray e1 to a sample S and a detector 23 detecting charged particles generated from the sample S in response to irradiation with the electron ray e1. The detector 23 includes a detector 23A detecting reflected electrons e2 from the sample S and a detector 23B detecting secondary electrons e3 from the sample S.

The detector 23A is constituted by, for example, the electron ray detector 1A, and the detector 23B is constituted by, for example, the electron ray detector 1F. The electron ray detector 1F is disposed in a tubular member 24 at a position closer to the sample S in comparison with the electron ray detector 1A. An electron ray e1 emitted from the electron source 22 is deflected by a scanning coil 25 and the sample S is scanned with the electron ray e1. The electron ray e1 passing through the scanning coil 25 passes through an objective lens 26 including a magnetic circuit and an excitation coil and then is applied to the sample S via the through-hole 6 of the electron ray detector 1A.

In response to irradiation with the electron ray e1, reflected electrons e2 and secondary electrons e3 are generated in the sample S. The reflected electrons e2 are incident on the electron ray detector 1A to cause the first fluorescent substance layer 3 to emit light. Primary fluorescent light L1 generated in the first fluorescent substance layer 3 and secondary fluorescent light L2 generated in the second fluorescent substance layer 4 are detected by the detection unit 5 and are converted to an output signal corresponding to an intensity of the detected light. The secondary electrons e3 are incident on the electron ray detector 1F and cause the first fluorescent substance layer 3 to emit light similarly to the electron ray detector 1A. The primary fluorescent light L1 generated in the first fluorescent substance layer 3 and the secondary fluorescent light L2 generated in the second fluorescent substance layer 4 are detected by the detection unit 5 and are converted to an output signal corresponding to an intensity of the detected light.

In the electron ray detectors 1A and 1F constituting the detectors 23A and 23B of the charged particle device 21, the primary fluorescent light L1 generated in the first fluorescent substance layer 3 is guided to the detection unit 5 by the light guide member 2, and the secondary fluorescent light L2 generated in the second fluorescent substance layer 4 in response to incidence of the primary fluorescent light L1 is guided to the detection unit 5 by the light guide member 2 or the second fluorescent substance layer 4. Accordingly, it is possible to enhance light guiding efficiency of light generated in response to incidence of the reflected electrons e2 and the secondary electrons e3 which are detection rays.

REFERENCE SIGNS LIST 1 (1A to 1L) Electron ray detector
G (G1 to G12) Light guide
2 Light guide member
2c First surface
2d Second surface
3 First fluorescent substance layer
4 Second fluorescent substance layer
5 Detection unit
6 Through-hole
7 Metal film
10 Reflecting film
11 Third fluorescent substance layer
12 Fourth fluorescent substance layer
21 Charged particle device
22 Electron source
23 Detector
E Detection ray
K Slope
L1 Primary fluorescent light
L2 Secondary fluorescent light
e1 Electron ray
e2 Reflected electron
e3 Secondary electron
S Sample

The invention claimed is:

1. A light guide comprising:
a light guide member extending in one direction;
a first fluorescent substance layer provided on one end portion side of the light guide member and generating primary fluorescent light in response to incidence of a detection ray; and
a second fluorescent substance layer extending from one end to the other end of the light guide member and generating secondary fluorescent light in response to incidence of the primary fluorescent light.

2. The light guide according to claim 1, wherein the second fluorescent substance layer extends to be closer to the other end of the light guide member than the first fluorescent substance layer.

3. The light guide according to claim 1, wherein the second fluorescent substance layer extends from one end to the other end of the light guide member.

4. The light guide according to claim 1, further comprising a third fluorescent substance layer extending from one end to the other end of the light guide member and generating tertiary fluorescent light in response to incidence of the secondary fluorescent light.

5. The light guide according to claim 1, wherein the first fluorescent substance layer is formed of one of gadolinium oxysulfide, yttrium silicate, YAG, YAP, a fluorescent substance with a quantum-well structure layer of InGaN/GaN, and ZnO.

6. The light guide according to claim 1, wherein the light guide member is formed of transparent glass, a transparent resin, air, or vacuum.

7. The light guide according to claim 1, wherein the light guide member includes a first surface and a second surface located opposite to the first surface,
wherein the first fluorescent substance layer is provided on the first surface side,
wherein the second fluorescent substance layer is provided on at least the second surface side, and
wherein the second surface includes a slope that is inclined to be closer to the first surface toward one end on the one end portion side of the light guide member.

8. The light guide according to claim 1, further comprising a reflecting film covering an edge of the second fluorescent substance layer on the one end portion side of the light guide member.

9. The light guide according to claim 1, wherein a through-hole penetrating the light guide member, the first fluorescent substance layer, and the second fluorescent substance layer is provided on the one end portion side of the light guide member.

10. The light guide according to claim 1, further comprising a metal film covering an inner wall of the through-hole.

11. An electron ray detector comprising:
the light guide according to claim 1; and
a detection unit provided on the other end portion side of the light guide member of the light guide and optically coupled to the light guide member.

12. A charged particle device comprising:
an electron source emitting an electron ray to a sample; and a detector detecting charged particles which are generated from the sample in response to irradiation with the electron ray, wherein the detector is constituted by the electron ray detector according to claim 11.

* * * * *